June 16, 1942. H. G. LEHMANN 2,286,990
COFFEE MAKER
Filed Sept. 8, 1939 2 Sheets-Sheet 1
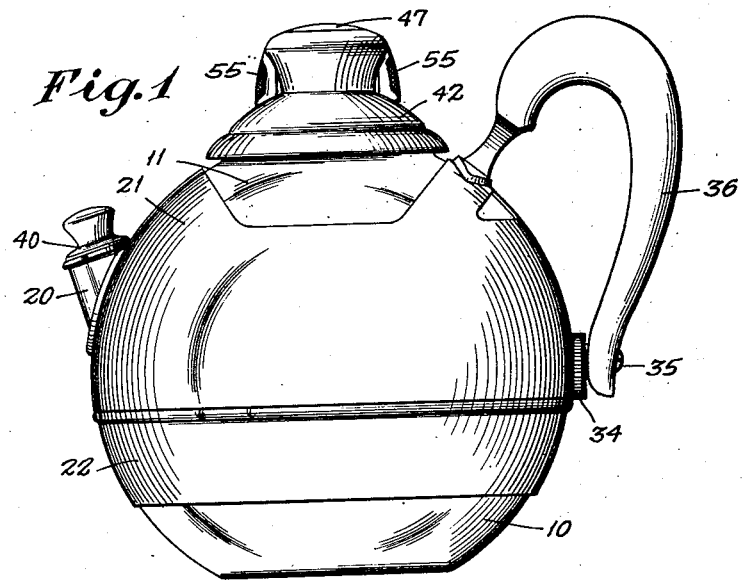
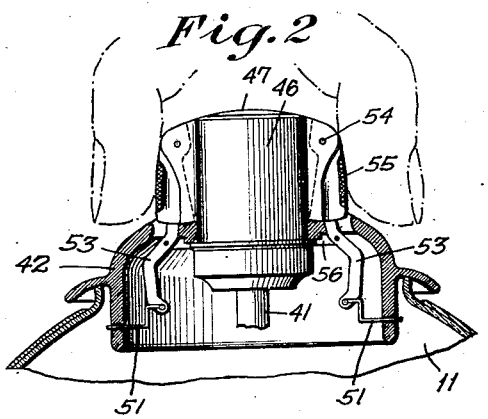
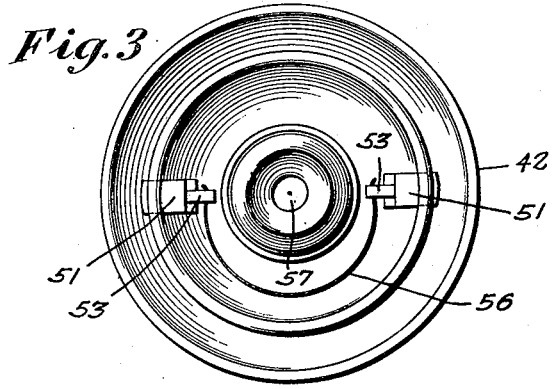
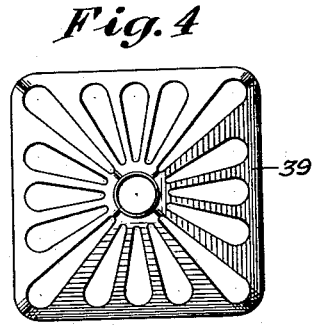
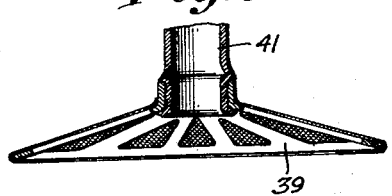
INVENTOR
Herbert G. Lehmann
BY
ATTORNEYS June 16, 1942.  H. G. LEHMANN  2,286,990
COFFEE MAKER
Filed Sept. 8, 1939  2 Sheets-Sheet 2
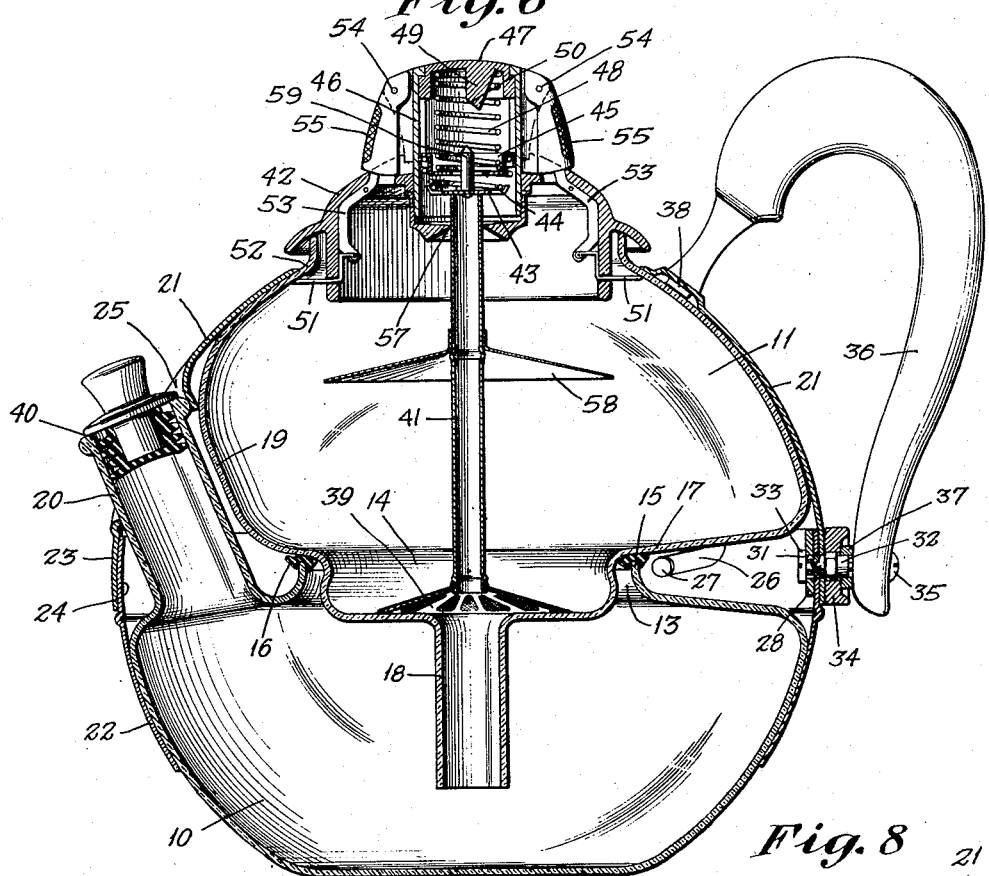
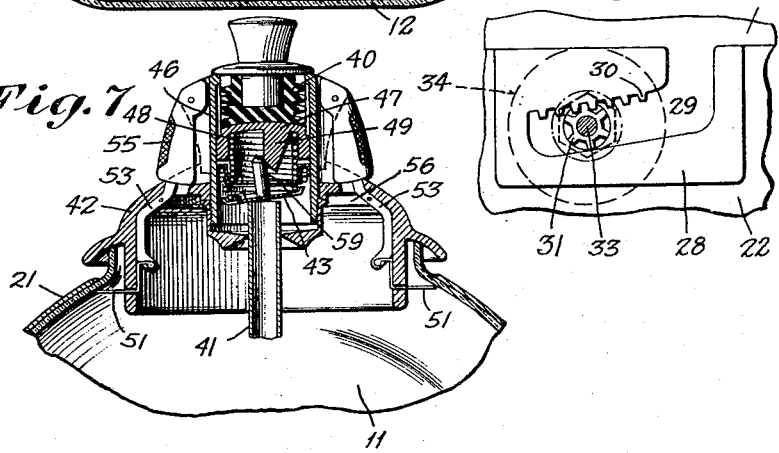
INVENTOR
*Herbert G. Lehmann*
BY
ATTORNEYS Patented June 16, 1942

2,286,990

UNITED STATES PATENT OFFICE 2,286,990

COFFEE MAKER

Herbert G. Lehmann, Wood-Ridge, N. J., assignor to Casco Products Corporation, Bridgeport, Conn., a corporation of Connecticut Application September 8, 1939, Serial No. 293,875

13 Claims. (Cl. 53—3)

This invention relates to coffee-makers, and more particularly to the type in which water heated in a lower vessel is forced through the ground coffee in an upper vessel and then later drawn through the ground coffee back to the lower chamber as the result of partial vacuum being formed in the lower vessel upon cooling of the latter, which type of appliance is herein termed as a vacuum coffee maker.

In coffee makers of this type, it was heretofore the custom to provide a lower vessel with a single opening or orifice into which a hollow stem on the upper vessel extends and by the walls of which the upper vessel is supported. Consequently, to pour the brewed coffee from the lower vessel it was necessary to remove the upper vessel and store it in some safe place. The storing of the upper vessel is frequently quite a problem for it cannot be supported upright except on a spindle-like holder which passes through the tube at the bottom of the vessel, and when so supported is easily tipped over because the main weight of the body is so high above the supporting surface.

Another difficulty with the vacuum type coffee makers as heretofore constructed has been the danger of the coffee maker tipping over while the coffee is being brewed, for the weight of the water when forced into the upper vessel moves the center of gravity high above the relatively limited supporting surface of the lower vessel. Besides, when the water from the lower vessel has been expelled to a point where the level thereof is below the orifice of the downwardly projecting tube, bubbles of air are forced up through the liquid in the upper vessel causing considerable agitation and frequently breaking the air-tight seal between the tube and the neck of the lower vessel.

The difficulties above referred to are obviated by the present invention by the provision of a coffee maker of the vacuum type in which the upper vessel and the lower vesel may remain united as one, both while the coffee is being made and while it is being poured from the coffee maker after being brewed. This arrangement permits coffee to be brewed and served at the dining table without the inconvenience and bother which is now attendant upon the removal of the upper vessel after the coffee is brewed and before it may be served. By this arrangement, the seal between the upper and lower chamber is mechanically maintained so that there is no likelihood of seepage of air into the lower vessel through this seal, which seepage would delay the return of the brewed coffee to the lower vessel and might even prevent the return of some of the brewed coffee to the lower vessel.

One of the features of this invention is the provision of upper and lower vessels of a vacuum type coffee maker which are so shaped that, together, they form a substantially spherical body, and so uniting these two vessels that they can be lifted and transported by a suitable handle as one vessel.

Another feature of this invention is the provision of a pouring spout on the lower vessel through which the brewed coffee may be served and yet which may be completely stopped off during the operation of the device so that the water in the lower vessel will be forced up into the upper vessel by expansion of it and the air above it.

Another feature of this invention is the provision of means for permitting air to enter the lower vessel so that the brewed coffee may pass through the pouring spout without being impeded either by the partial vacuum which would otherwise be formed in the lower vessel, or by in-rush of air trying to enter the lower vessel through the pouring spout, said means being so constructed as to prevent air or water from escaping therethrough while the coffee is being brewed.

A still further feature of this invention is the provision of a cap or cover for the upper vessel which is securely locked in place and which contains the valve mechanism for controlling the air inlet means above referred to, and which contains a cavity for supporting a stopper for the pouring spout after the coffee is brewed. Preferably, the insertion of the stopper in the cover or cap automatically operates the valve to admit air to the lower vessel. The combination of the cover and vessel is disclosed and claimed in application Serial No. 432,431, filed February 26, 1942, which is a division of the present application.

Other features and advantages will hereafter appear.

In the accompanying drawings, which show one form of this invention—

Figure 1 is a side elevation, showing the coffee maker arranged for brewing coffee.

Fig. 2 is a sectional view of the top portion of the upper vessel, showing the cover or cap unlocked therefrom and ready to be removed.

Fig. 3 is a bottom plan view of the cap with the parts in the positions shown in Fig. 2.

Fig. 4 is a plan view of the filter plate.

Fig. 5 is a sectional view, showing the lower end of the air inlet tube and the filter plate, with the filter mounted in position on the filter plate.

Fig. 6 is a vertical section through the coffee maker of the present invention, showing the parts in the positions they occupy during the brewing of coffee.

Fig. 7 is a sectional view of the upper portion of the coffee maker, showing the parts of the cap in the positions they occupy during the pouring of the brewed coffee.

Fig. 8 is a detailed view, showing the means for locking the upper and lower vessels together for movement as one.

As shown in the accompanying drawings, and referring particularly to Figs. 1 and 6, the coffee maker of the present invention comprises a lower vessel 10 and an upper vessel 11, each vessel being approximately hemispherical and having their relatively flat sides adjacent so that when they are assembled they will form a substantially spherical body.

The bottom of the lower vessel 10 is provided with a flat surface 12 by means of which the coffee maker may be supported, and at its upper end the vessel 10 has a relatively wide open mouth 13 adapted to receive a sump portion 14 of the upper vessel 11. A lip 15 of the mouth 13 supports a gasket 16 of rubber or other suitable material which is engaged by a bottom porton 17 of the upper vessel 11 and supports the upper vessel on the lower vessel with the sump 14 extending into the lower vessel. The upper vessel has the usual downwardly extending tube 18 through which water contained within the bottom vessel 10 when heated will pass upwardly through ground coffee in the sump 14 and into the upper vessel 11 where the coffee is brewed.

As shown in Fig. 6, the upper vessel 11 is flattened or otherwise suitably shaped at 19 to provide space for an upwardly extending spout 20 connected to the lower vessel and through which the brewed coffee may be poured when serving.

According to the present invention, the lower vessel 10 and upper vessel 11 are united as one, and for this purpose any suitable means may be employed. However, it is at present preferred to unite the two vessels by providing two properly shaped casings 21 and 22 overlying and underlying respectively the largest dimensions of the vessels 11 and 10. These casing parts are provided with overlapping marginal portions 23 and 24 which are secured together, and the upper casing 21 is provided with an aperture 25 through which the spout 20 extends.

The casing parts 21 and 22 are secured together by bayonet locks comprising slots 26 in the part 22 and pins 27 in the part 21. After the vessels 10 and 11 are superposed, the parts 21 and 22 are placed over and under them so that the pins 27 enter the openings of the slot 26, whereupon the lower part is turned relative to the upper part causing the parts to be drawn together by the inclined walls of the slots 26.

To facilitate the relative movement between the parts 21 and 22 of the casing, actuating mechanism shown in Fig. 8 may be employed. For this purpose, the lower casing part 22 is thickened and reenforced by a plate 28 provided with a slot 29 and having gear teeth 30 on one wall of the slot forming a rack. These gear teeth are engaged by a pinion 31 carried by a shaft 32 extending through a hole in the upper part 21 of the casing. A screw 33 extends into the shaft 32 and has a head engaging the plate 28 to keep the plate from springing inwardly and out of mesh with the pinion 31. At its outer end, the shaft 32 is provided with a knurled knob 34 by means of which it may be turned, and when it is turned to the right, the pinion causes the rack to advance to the right and thereby moves the lower part 22 relative to the upper part 21, drawing the two parts tightly together.

The outside end of the shaft is threaded and carries a screw 35 by means of which a handle 36 may be secured to the casing, a spacing washer 37 being interposed between the handle and the adjusting knob 34. The upper end of the handle 36 is suitably secured, as by a rivet 38, to the upper portion of the casing part 21. The bayonet lock pins and the tightening mechanism, including the plate 28, are located in the space between the bottom of the upper vessel and the top of the lower vessel.

In the broader aspects of this invention, any suitable filter or strainer may be used to retain the coffee grounds in the sump 14 or other lower part of the upper vessel 11.

In the form of the invention herein disclosed, this is accomplished by providing an apertured plate 39 which fits over the opening at the upper end of the tube 18 and which may be covered with suitable cloth to strain the brewed coffee and prevent the grounds from passing down into the lower chamber.

While the water is being heated to drive it up into the vessel 11, it is, of course, essential to prevent the escape of air from the lower vessel 10, because it is the expansion of the water and air in the lower vessel 10 which causes the water to rise in the tube 18. For this purpose, the spout 20 is provided with a stopper 40 which, of course, may be removed when it is desired to pour the brewed coffee.

When brewed coffee is to be poured from the lower vessel 10, it is necessary for the liquid removed to be replaced by air. I have found that the ground coffee in the sump 14 packs so tightly that sufficient air cannot enter the lower vessel through the compacted and wet ground coffee. I have also found that if the brewed coffee is poured rapidly from the spout 20, the in-rush of air tends to gurgle and cause the coffee to be spattered rather than to fall in a smooth stream into the cup.

According to the present invention in its broader aspects, any suitable means may be employed for introducing air to the lower vessel 10 when pouring the coffee through the spout 20. In the specific embodiment of the invention illustrated herein as exemplary thereof, this is accomplished by providing an air inlet tube 41, and conveniently this air inlet tube may be secured to and be supported by the filter plate 39. This tube extends upwardly through the upper vessel 11 and to a point near the top thereof, and is held closed against the passage of air or water while the water in the lower vessel 10 is being heated. Otherwise, the heated water would not be forced into the upper vessel 11.

For the purpose of normally closing the air inlet tube 41, a cap 42 for the upper vessel is provided with a valve disk 43 engaging the upper edge of the tube 41 under pressure of a spring 44. This spring 44, in turn, engages a wall 45 within a tube 46, which is preferably molded in the cap 42. Slidably mounted within the tube 46 is a button 47 normally held in the position shown in Fig. 6 by a spring 48 contacting the wall 45 at its lower end. This button 47 is provided with a downwardly extending lug 49, the end of which has an incline 50. The lug 49 is located directly above a pin 59 on the valve disk 43.

When the button 47 is pushed down, the incline or cam 50 on the lug 49 engages the pin 59 and tilts the valve disk to one side, as shown in Fig. 7, thereby raising the disk from one side of the tube 41 and permitting air to enter the tube.

The button 47 may be held down in any suitable way, but, according to the invention in its illustrated form, the button is operated and maintained depressed by the stopper 40, which, when it is removed from the spout 20, may be placed against the button 47 and pressed downwardly to the position shown in Fig. 7, where it remains until again removed.

Thus, not only is the air vent valve automatically operated by the insertion of the stopper, but a convenient place to store the stopper during the pouring of the coffee is provided.

The cap 42 does not have an air-tight connection with the upper vessel 11, and therefore the interior of the upper chamber also has free communication with the atmosphere.

The cap 42 may be secured in place on the top of the upper vessel 11 by any suitable means. The means provided for this purpose by the present invention comprises a pair of slide bolts 51 adapted to extend under a curved shoulder 52 provided at the mouth of the vessel 11 and pivotally attached to arms 53 which are pivoted at 54 and having finger pieces 55 by means of which they may be swung inwardly. The finger pieces 55 extend outwardly through slots in the cap 42 and are held in their outward position with the slide bolts 51 in the position shown in Fig. 1 by a spring 56 shown in Fig. 3.

The slide bolts 51 engaging the downwardly and outwardly inclined surface of the upper vessel and being spring pressed outwardly, tend to draw the cap 42 tightly against the mouth of the vessel 11, holding the valve disk 43 against the air inlet tube, even though there may be the ordinary variations of the size and shape of the vessel 11.

The cap 42 is provided with a central aperture 57 through which the upper end of the air inlet tube 41 extends and by which it is centralized and supported against tilting over.

To prevent fluid which bubbles in the upper vessel 11 from splashing out through the apertures in the cap 42, a deflector plate 58 may be provided on the air inlet tube as shown in Fig. 6. Thus, it will be seen that one single removable piece serves as a filter support and air inlet tube and a baffle. When the cap 42 is removed, this piece may be easily removed through the open top of the vessel 11 for cleansing.

Variations and modifications may be made within the scope of this invention and portions of the improvements may be used without others.

I claim:

1. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel; air-inlet means for permitting free passage of air into the lower vessel after the coffee is brewed and while it is being poured; and means on the utensil for storing said spout-closing means when removed from the spout, said last-named means being associated with said inlet means, and said spout-closing means operating said air-inlet means to open the same when placed in said storing means.

2. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air-inlet tube extending through said filtering device and any ground coffee which might be retained by the latter and extending vertically through said upper vessel to a point adjacent said cap; and a valve and mechanism operating the valve in said cap for closing and opening said air-inlet tube.

3. The invention as defined in claim 2, in which the valve operating mechanism includes a spring-operated disk engaging the upper portion of said tube.

4. The invention as defined in claim 2, in which the valve mechanism includes a spring-operated disk engaging the upper end of said tube, and includes means for tilting the disk to permit air to enter the tube.

5. The invention as defined in claim 2, in which the valve mechanism includes a spring-operated disk engaging the upper end of said tube, and includes means for tilting the disk to permit air to enter the tube, said valve and operating mechanism therefor being adapted to support the stopper for the spout when the latter is removed from the spout, said stopper being adapted to operate said valve-actuating mechanism to tilt the valve disk and open the air-inlet tube.

6. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel; an air duct in the upper vessel communicating directly with the tube thereon which enters the lower vessel; a spring-operated valve maintaining said air duct normally closed; and means for opening and holding open said valve thereby allowing air to enter the lower vessel through said air duct and tube.

7. The invention as defined in claim 2, in which the valve mechanism includes a spring-operated disk engaging the upper end of said tube, and includes means for tilting the disk to permit air to enter the tube, said valve and operating mechanism therefor being adapted to support the stopper for the spout when the latter is removed from the spout, said stopper being adapted to operate said valve-actuating mechanism to tilt the valve disk and open the air-inlet tube, and in which there is means for locking the cap in operative position on the upper vessel.

8. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel; air-inlet means for permitting free passage of air into the lower vessel after the coffee is brewed and while it is being poured; and a cap for covering an opening at the top of the upper vessel, said air-inlet means extending to said cap and said cap containing a spring-pressed valve for closing said air inlet means.

9. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel; a combined filter means and air-inlet means mounted in said upper vessel and comprising a plate for supporting a filtering medium, a tube mounted on and extending through said plate and in communication with the tube which is on the upper vessel and extending into the lower vessel, said tube extending to a point above the highest liquid level in said upper vessel; a cap for covering an opening at the top of the upper vessel; and means carried by said cap for closing the upper end of said tube, said means being adapted to open said tube to allow air to enter the lower vessel when it is desired to pour the brewed coffee.

10. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being forced up through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air-inlet tube extending through said filtering device and any ground coffee which might be retained by the latter and extending vertically through said upper vessel to a point adjacent said cap; and a valve seating on said tube at the upper end thereof and held against the mouth of the tube by said cap.

11. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel; air-inlet means for permitting free passage of air into the lower vessel after the coffee is brewed and while it is being poured; a cap for closing an opening at the top of the lower vessel; and valve means associated with said air-inlet means for preventing the passage of air into the lower vessel while the water in the lower vessel is being expelled through the tube and while the brewed coffee is returning to the lower vessel, said cap normally holding said valve closed and having means associated therewith for opening said valve when it is desired to pour the coffee from the lower vessel.

12. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air-inlet tube extending through said filtering device and any ground coffee which might be retained by the latter and extending vertically through said upper vessel to a point adjacent said cap; a valve seating on the upper end of said air-inlet tube; and a valve actuating mechanism carried by said cap and including a spring-pressed disk carrying a finger adapted to be moved into engagement with said valve to tilt the same and open said air-inlet tube when the disk is depressed, said valve actuating mechanism including means for storing the spout-closing means, the storage of said spout-closing means incidentally depressing said disk and causing said finger to tilt said valve and open the air-inlet tube.

13. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; a pouring spout on the lower vessel; means for closing the spout against the passage of air while the water in the lower vessel is being expelled through the said tube and while the brewed coffee is returning to the lower vessel, said upper vessel having an opening at its top; a cap for covering said opening during the brewing of coffee; a filtering device carried by said upper vessel to prevent ground coffee from passing down through said tube into the lower vessel; an air-inlet tube extending through said filtering device and any ground coffee which might be retained by the latter and extending vertically through said upper vessel to a point adjacent said cap; a valve seating on the upper end of said air-inlet tube for closing the same; means formed on said cap for centering said valve and normally holding the same seated on said tube; and means carried by said cap for opening said valve to allow the passage of air through said air-inlet tube, said means including means cooperating with said valve to tilt the same and open the air-inlet tube.

HERBERT G. LEHMANN.